(12) United States Patent
Senoo et al.

(10) Patent No.: US 11,618,494 B2
(45) Date of Patent: Apr. 4, 2023

(54) STEERING GEARBOX ATTACHMENT STRUCTURE

(71) Applicant: ISUZU MOTORS LIMITED, Tokyo (JP)

(72) Inventors: Daisuke Senoo, Fujisawa (JP); Kyouhei Katou, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 207 days.

(21) Appl. No.: 16/770,493

(22) PCT Filed: Dec. 5, 2018

(86) PCT No.: PCT/JP2018/044737
§ 371 (c)(1),
(2) Date: Jun. 5, 2020

(87) PCT Pub. No.: WO2019/111954
PCT Pub. Date: Jun. 13, 2019

(65) Prior Publication Data
US 2021/0179164 A1 Jun. 17, 2021

(30) Foreign Application Priority Data
Dec. 8, 2017 (JP) .............................. JP2017-236357

(51) Int. Cl.
B62D 3/12 (2006.01)
(52) U.S. Cl.
CPC .......... B62D 3/12 (2013.01); *B60G 2200/144* (2013.01); *B60G 2200/44* (2013.01);
(Continued)

(58) Field of Classification Search
CPC .............. F16H 57/02; B60G 2202/114; B60G 2200/144; B60G 2206/604; B62D 3/12
See application file for complete search history.

(56) References Cited

U.S. PATENT DOCUMENTS 3,149,855 A 9/1964 Adloff et al.
3,157,061 A * 11/1964 Parker .................... B62D 3/123
74/498

(Continued)

FOREIGN PATENT DOCUMENTS

CN 1468743 A 1/2004
CN 103358847 A 10/2013
(Continued)

OTHER PUBLICATIONS

Chinese Patent Office, Office Action, Application No. CN201880078872.6, dated Jan. 6, 2022 in 15 pages.
(Continued)

*Primary Examiner* — Paul N Dickson
*Assistant Examiner* — Maxwell L Meshaka
(74) *Attorney, Agent, or Firm* — Procopio, Cory, Hargreaves & Savitch LLP

(57) ABSTRACT

A steering gearbox attachment structure according to one embodiment of the present disclosure attaches and secures a steering gearbox to cross members positioned in the vehicle widthwise direction, and is equipped with support parts provided on the cross members, and a steering gearbox housing part which has contact parts. The first attachment surface of the first support part and the second attachment surface of the second support part form an angle which is greater than 90° and less than 180°.

2 Claims, 11 Drawing Sheets

(52) U.S. Cl.
CPC .... *B60G 2202/114* (2013.01); *B60G 2204/10* (2013.01); *B60G 2206/604* (2013.01); *B60G 2300/02* (2013.01)

(56) References Cited

U.S. PATENT DOCUMENTS

| | | | | |
|---|---|---|---|---|
| 4,028,957 A | * | 6/1977 | Wright | B62D 3/12 |
| | | | | 74/498 |
| 4,819,499 A | * | 4/1989 | Morell | B62D 5/22 |
| | | | | 74/498 |
| 4,887,683 A | * | 12/1989 | Klosterhaus | B62D 3/12 |
| | | | | 180/428 |
| 5,613,709 A | | 3/1997 | Nakamichi | |
| 2003/0234506 A1 | | 12/2003 | Yokoyama | |
| 2011/0192673 A1 | * | 8/2011 | Coleman | B62D 3/12 |
| | | | | 29/428 |
| 2013/0277137 A1 | | 10/2013 | Kawaguchi et al. | |
| 2013/0277935 A1 | * | 10/2013 | Harris | B62D 3/12 |
| | | | | 280/93.514 |
| 2014/0246260 A1 | | 9/2014 | Awano et al. | |

FOREIGN PATENT DOCUMENTS

| | | | |
|---|---|---|---|
| CN | 104029734 A | | 9/2014 |
| DE | 1146380 B | | 7/1960 |
| JP | S57204966 A | | 12/1982 |
| JP | H03043077 A | | 2/1991 |
| JP | H05000579 A | | 1/1993 |
| JP | H07112607 A | | 5/1995 |
| JP | H07137643 A | | 5/1995 |
| JP | H08-072729 A | | 3/1996 |
| JP | 2004017797 A | | 1/2004 |
| JP | 2006192940 A | | 7/2006 |
| JP | 2017165192 A | | 9/2017 |
| KR | 20100031228 A | * | 3/2010 |

OTHER PUBLICATIONS

International Search Report and Written Opinion for related Int, App No. PCT/JP2018/044737 dated Feb. 19, 2019. English translation provided; 9 pages.

* cited by examiner

[FIG.1]
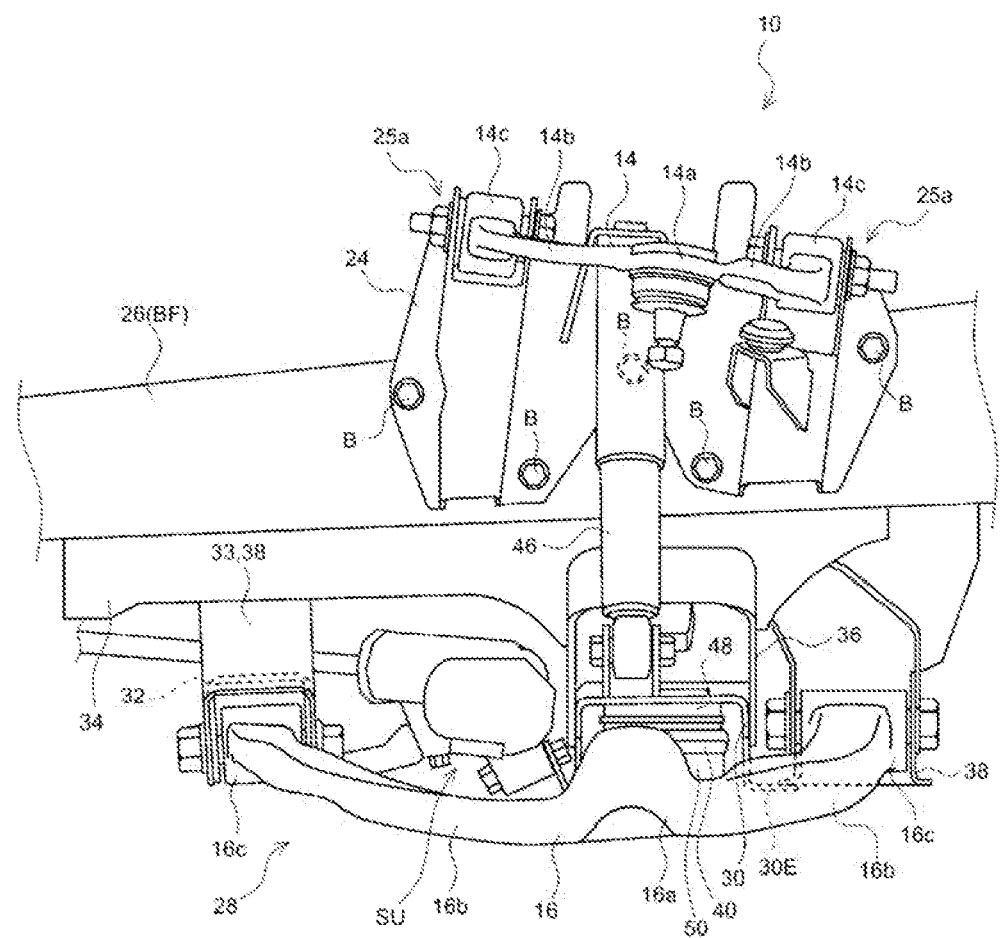

[FIG.2]
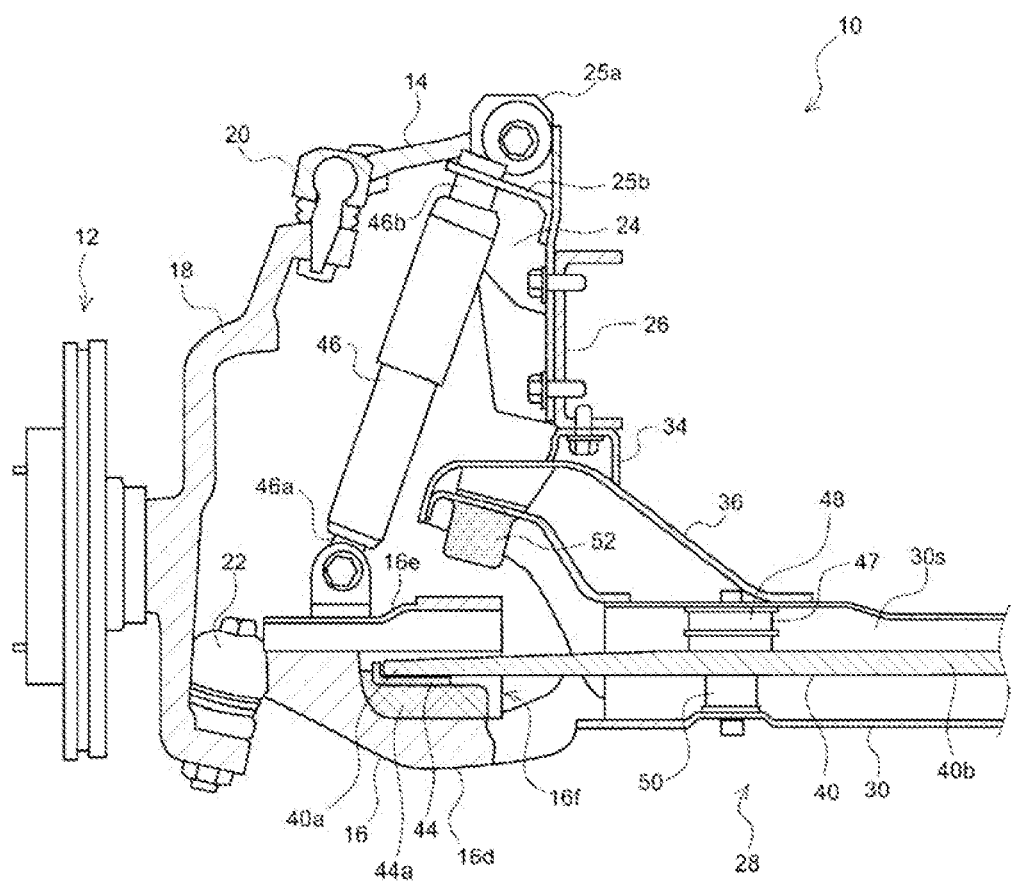

[FIG.3]
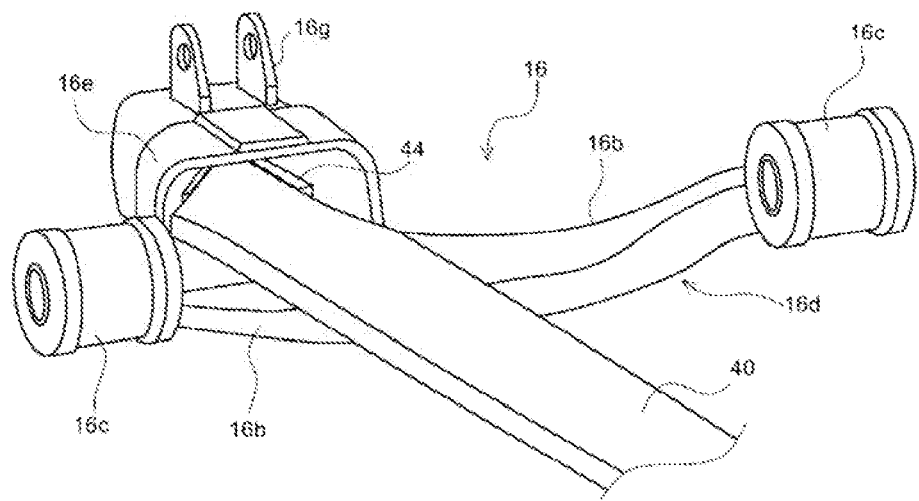

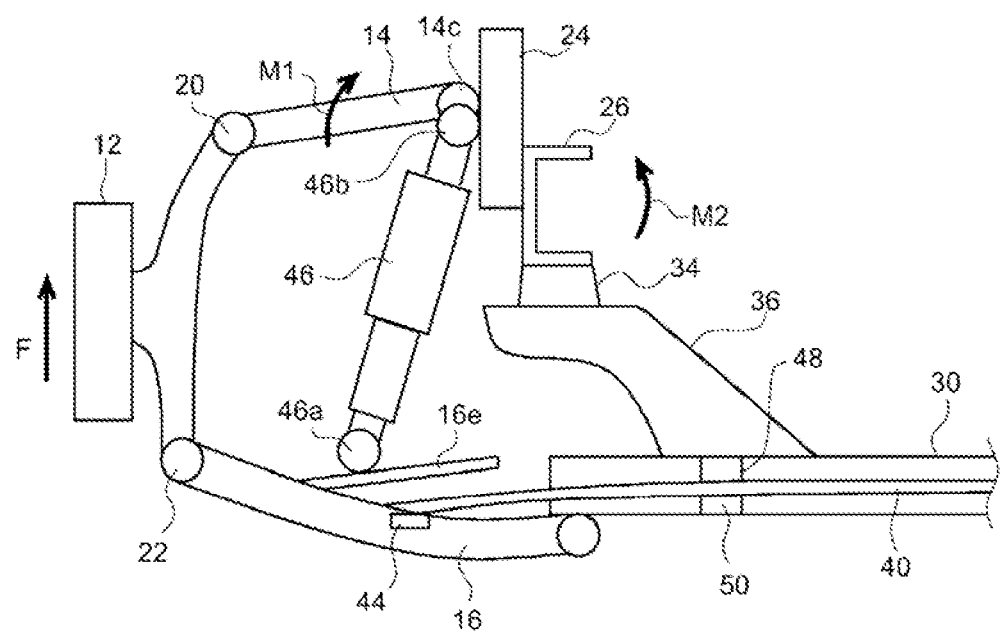
[FIG.4]

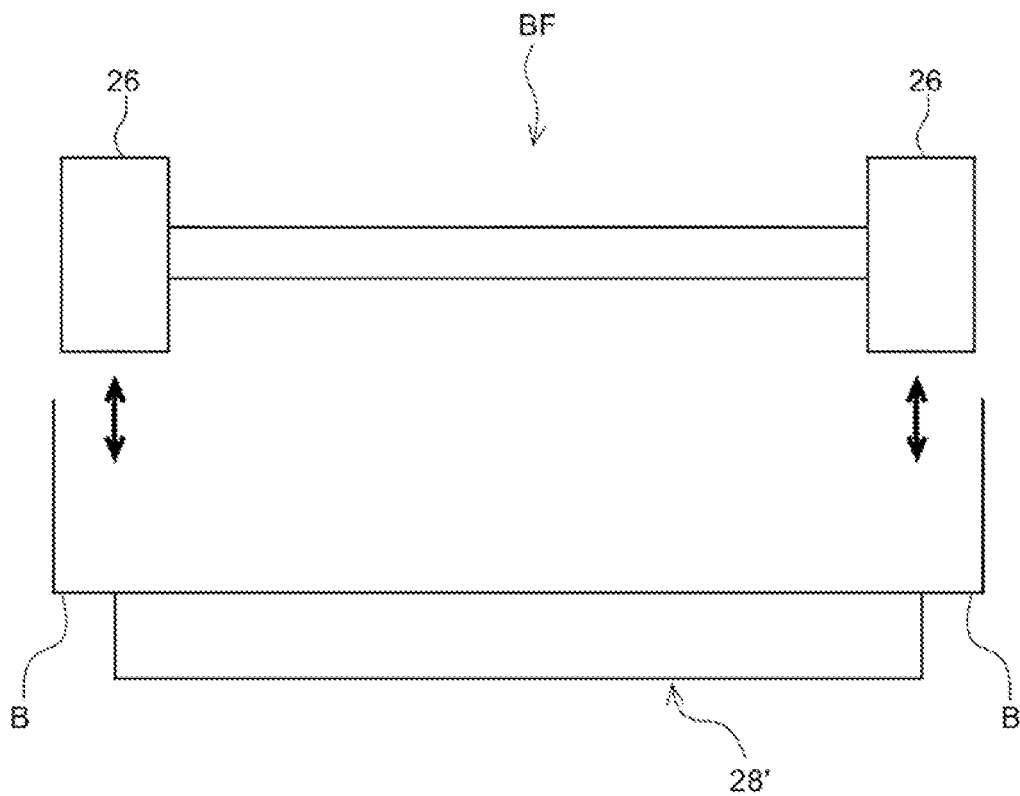
[FIG.5]

[FIG.6]
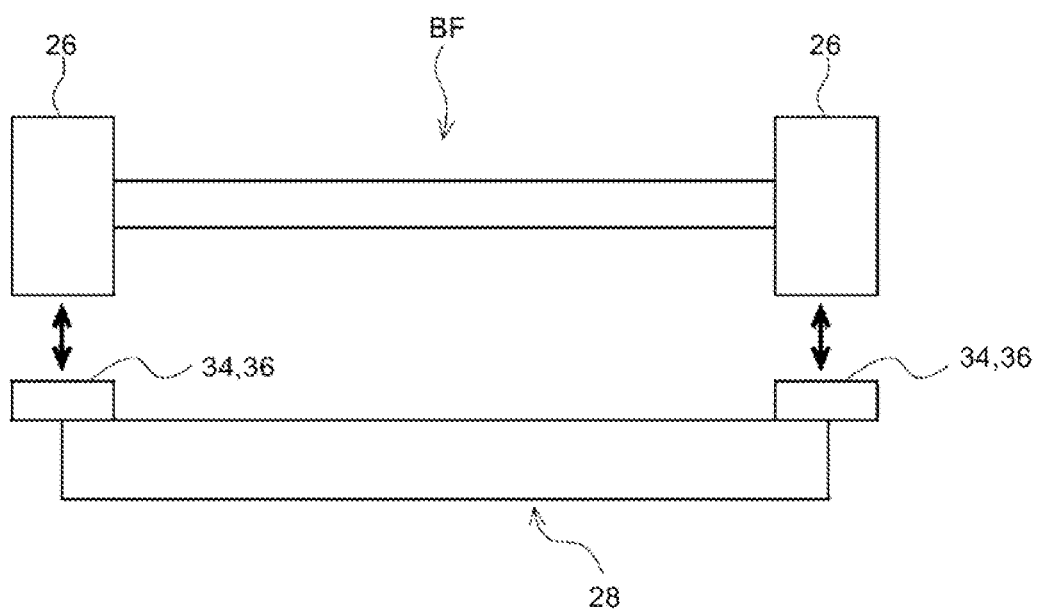

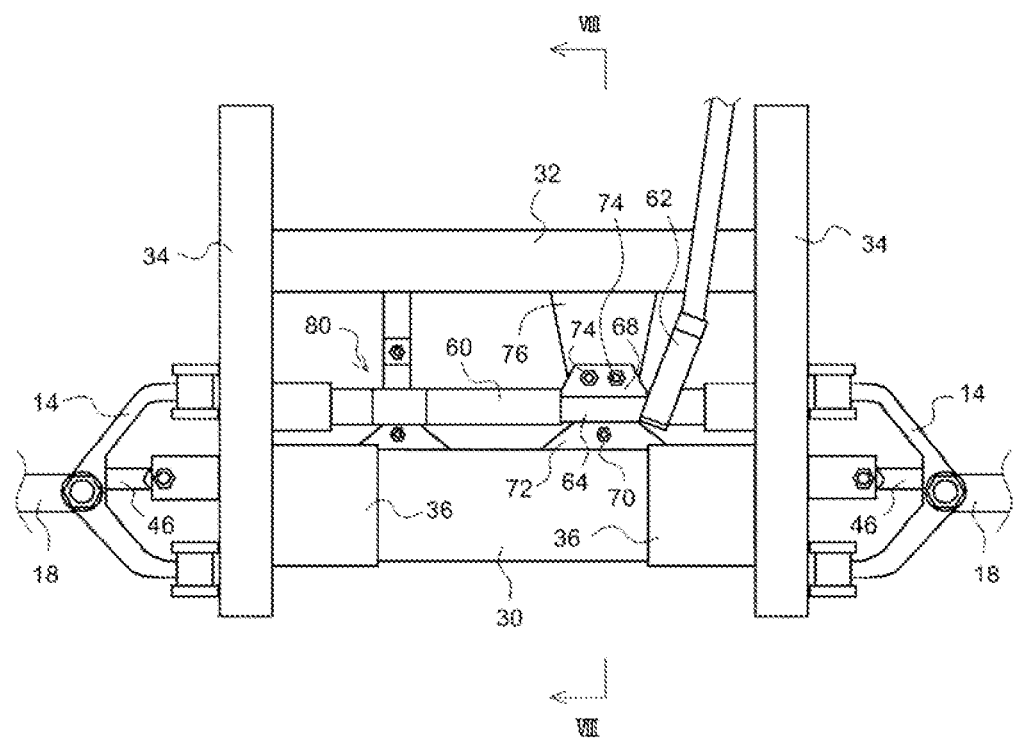
[FIG.7]

[FIG.8]
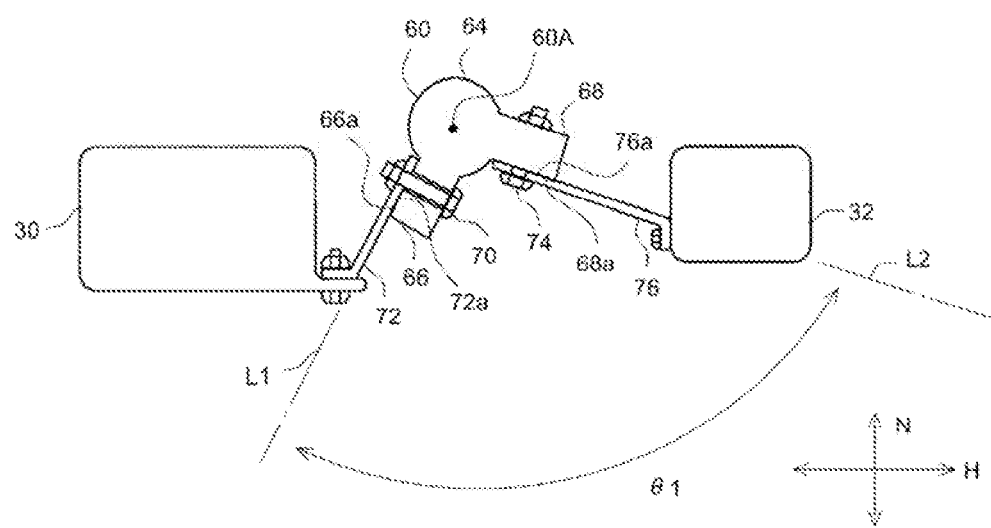

[FIG.9A]
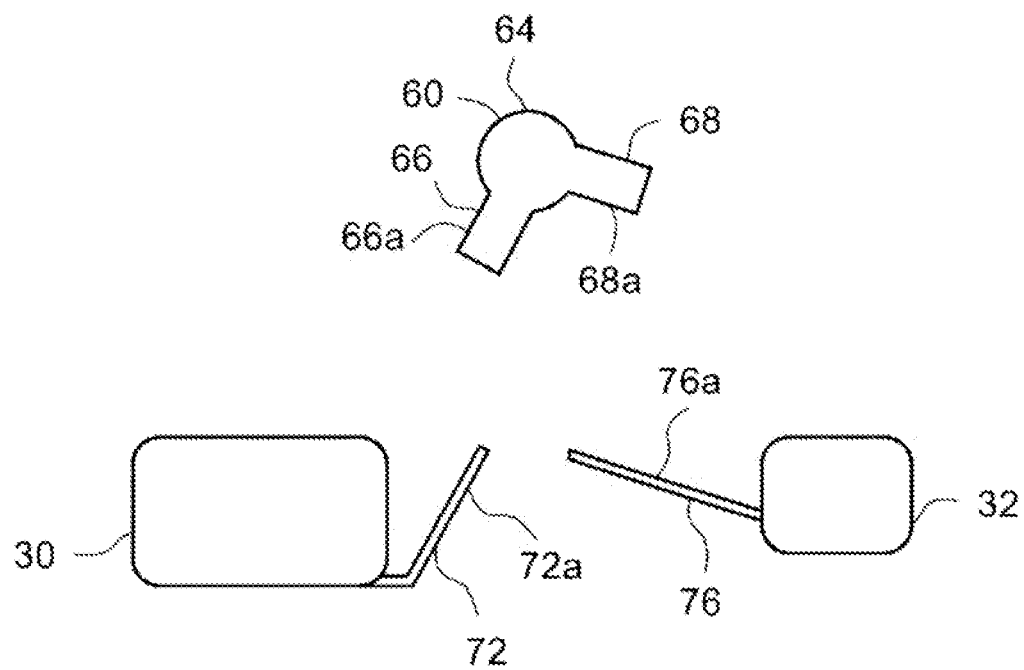

[FIG.9B]
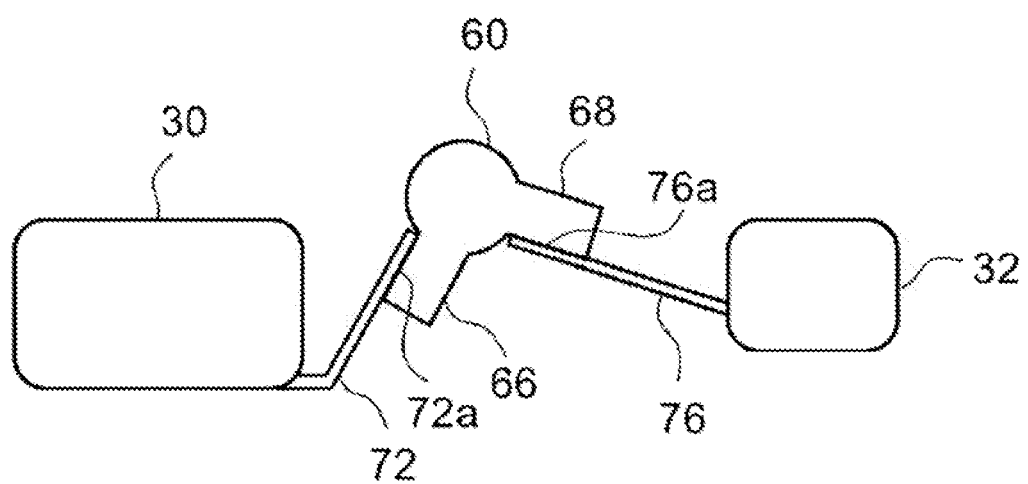

[FIG.9C]
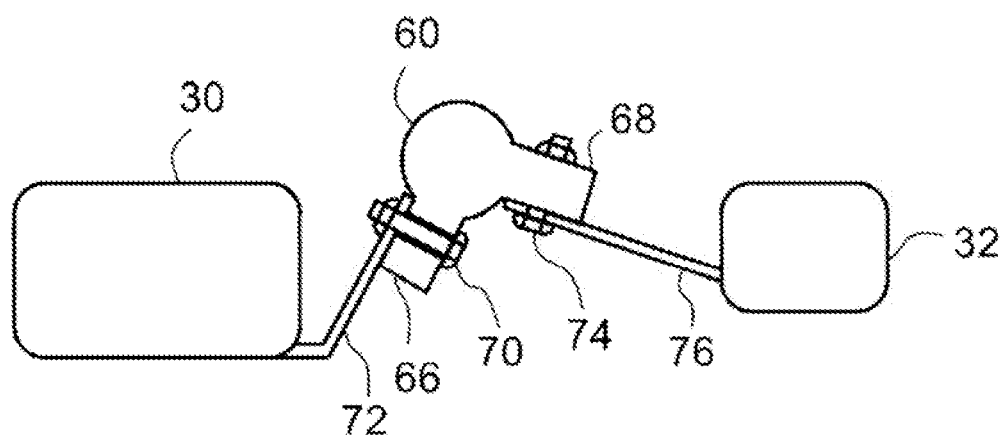

STEERING GEARBOX ATTACHMENT STRUCTURE

CROSS-REFERENCE TO RELATED APPLICATIONS

This application is a U.S. National Stage entry of PCT Application No. PCT/JP2018/044737, filed on Dec. 5, 2018, which claims priority to SP Application No. 2017-216357, filed on Dec. 8, 2017. The contents of the foregoing are incorporated by reference.

TECHNICAL FIELD

The present disclosure relates to a steering gearbox attachment structure of a steering device.

BACKGROUND ART

Patent Literature 1 discloses an example of a steering gearbox attachment structure. In Patent Literature 1, a radiator cross member and a suspension cross member located at a vehicle rear side of the radiator cross member are provided between side rails provided on two sides of a vehicle on a vehicle front side. A steering gearbox (including a rack) of a rack and pinion type power steering device is arranged in a vehicle width direction between the cross members (in a vehicle front-rear direction). The steering gearbox is fixed across the radiator cross member and the suspension cross member. A pinion shaft connected to a steering wheel side is connected to the rack of the steering gearbox, and a front wheel is steered by rotation of the pinion shaft via a tie rod and a knuckle.

Fixing of the steering gearbox of Patent Literature 1 is performed by a vertical direction attachment bolt and a horizontal direction attachment bolt. In this way, in Patent Literature 1, the steering gearbox is positioned by an attachment surface having a horizontal surface and a vertical surface.

CITATION LIST

Patent Literature

Patent Literature 1: JP-A-2004-017797
Patent Literature 2: JP-A-H7-112607

SUMMARY OF INVENTION

Technical Problem

However, positioning accuracy of the steering gearbox greatly affects steering performance of wheels. Therefore, there is a demand for further increasing the positioning accuracy of the steering gearbox. Meanwhile, it is not preferable to impair workability of an operator even when the positioning accuracy of the steering gearbox can be improved.

An object of a technique of the present disclosure is to provide a steering gearbox attachment structure which is aimed at improving the positioning accuracy of the steering gearbox without impairing the workability of the operator.

Solution to Problem

To achieve the above object, the technique of the present disclosure provides a steering gearbox attachment structure including: a first support portion and a second support portion, the first support portion and the second support portion being provided to at least one frame member provided to a vehicle body, the first support portion having a fit attachment surface, the second support portion having a second attachment surface; a housing of a steering gearbox, the housing including a first abutting portion and a second abutting portion, the first abutting portion being abuttable against the first attachment surface of the first support portion, the second abutting portion being abuttable against the second attachment surface of the second support portion; and fixing means for fixing the housing to the first support portion and the second support portion in a state where the first abutting portion abuts against the first attachment surface and the second abutting portion abuts against the second attachment surface, in which the first attachment surface and the second attachment surface are formed such that an angle between the first attachment surface of the first support portion and the second attachment surface of the second support portion is greater than 90° and less than 180°.

Preferably, when the housing of the steering gearbox is fixed to the first support portion and the second support portion, the first attachment surface and the second attachment surface are formed such that the first attachment surface of the first support portion and the second attachment surface of the second support portion are substantially parallel to an axis of the steering gearbox.

A first abutting surface of the first abutting portion and a second abutting surface of the second abutting portion may be formed such that, in a direction around the axis of the steering gearbox, the first abutting surface is located on the first abutting portion on the same side as a side where the second abutting surface is located on the second abutting portion, the first abutting surface being abuttable against the first attachment surface, the second abutting surface being abuttable against the second attachment surface.

Preferably, the first support portion is provided to a first cross member extending in a vehicle width direction, and the second support portion is provided to a second cross member extending in the vehicle width direction, and the first cross member and the second cross member are provided in a suspension device such that the second cross member is separated from the first cross member in a vehicle front-rear direction.

Advantageous Effects of Invention

According to the above-described technique of the present disclosure, since the above configuration is provided, the positioning accuracy of the steering gearbox can be improved without impairing the workability of the operator.

BRIEF DESCRIPTION OF DRAWINGS

FIG. 1 is a configuration diagram of a suspension device according to an embodiment, and is a diagram viewed from a vehicle lateral side.

FIG. 2 is a configuration diagram of one wheel side of the suspension device of FIG. 1, and is a partial cross-sectional view.

FIG. 3 shows a lower arm and a leaf spring of the suspension device of FIG. 1.

FIG. 4 is a schematic explanatory diagram of the suspension device of FIG. 2.

FIG. 5 is an explanatory diagram of assembly of a suspension device in related art.

FIG. 6 is an explanatory diagram of assembly of the suspension device of FIG. 1.

FIG. 7 is a schematic view of a part of the suspension device of FIG. 1 as viewed from above.

FIG. 8 is a schematic cross-sectional view of a periphery of a steering gearbox at a location substantially along line VIII-VIII of FIG. 7.

FIG. 9A shows a first step of a steering gearbox attachment process.

FIG. 9B shows a second step of the steering gearbox attachment process.

FIG. 9C shows a third step of the steering gearbox attachment process.

DESCRIPTION OF EMBODIMENTS

An embodiment according to the technique of the present disclosure will be described below based on the accompanying drawings. The same components (or configurations) are denoted by the same reference numerals, and names and functions thereof are also the same. Therefore, a detailed description thereof will not be repeated.

First, a suspension device 10 where a steering device SU according to the present embodiment is supported and attached will be described. FIG. 1 shows a schematic configuration of apart of the suspension device 10 according to an embodiment. FIG. 2 shows a configuration of one wheel side of the suspension device 10, and a part thereof is shown in cross section. The suspension device 10 is applied to a front wheel of a vehicle herein, and a reference numeral "12" of FIG. 2 is a hub that supports a left front wheel (not shown). FIG. 1 is a diagram of the suspension device 10 of FIG. 2 (excluding hubs and knuckles of the left front wheel) as viewed from a lateral side of the left front wheel. Since a right front wheel side (not shown) has a configuration that is substantially bilaterally symmetrical to configurations of FIGS. 1 and 2, a description thereof will be substantially omitted below. A vehicle width direction refers to a direction that is substantially orthogonal to a paper surface of FIG. 1 and is substantially parallel to a paper surface of FIG. 2. A vehicle front-rear direction refers to a direction that is substantially parallel to the paper surface of FIG. 1 and is substantially orthogonal to the paper surface of FIG. 2.

The suspension device 10 is configured as a suspension device of an independent suspension type. The suspension device 10 includes: an upper arm 14 having a substantially V-shaped or substantially A-shaped planar shape; and a lower arm 16 having a substantially V-shaped or substantially A-shaped planar shape. An upper portion of the wheel knuckle 18 is pivotally supported, that is, swingably supported via a ball joint 20 by the upper arm 14, and in particular, by an outer end portion (base portion) 14a of the upper arm 14 in the vehicle width direction. A lower portion of the wheel knuckle 18 is swingably supported via a ball joint 22 by the lower arm 16, and in particular, by an outer end portion (base portion) 16a in the vehicle width direction.

Arm end portions 14c of two arm portions 14b, which are bifurcated inward in the vehicle width direction from the base portion 14a of the upper arm 14, are coupled to an upper arm bracket 25a of a bracket 24. As a result, the upper arm 14 is swingably supported around a support shaft of the bracket 25a. The bracket 24 is fixed to a side member 26 extending in the vehicle front-rear direction. The side member 26 is a component of a vehicle body frame BF (not shown), and is arranged on two sides of the vehicle. In the suspension device 10, as shown in FIG. 1, the bracket 24 is fixed to the side member 26 by five bolts B arranged in a W shape. However, the number, arrangement, and the like of the bolts for fixing the bracket 24 are not limited thereto.

A suspension cross member 28 is arranged in the vehicle width direction on a vertical direction lower side of, that is, below left and right side members 26 of the vehicle body frame BF (FIGS. 1 and 2 illustrate only the side member 26 on the left side of the vehicle). The suspension cross member 28 has a certain width in the vehicle front-rear direction, and includes a plurality of members extending in the vehicle width direction and a plurality of members extending in the vehicle front-rear direction so as to connect the members extending in the vehicle width direction. Specifically, the suspension cross member 28 includes: a main cross member 30 extending in the vehicle width direction; a sub-cross member 32 extending in the vehicle width direction; and longitudinal members 34 extending in the vehicle front-rear direction. The sub-cross member 32 is provided in the suspension device 10 so as to be spaced apart from the main cross member 30 in the vehicle front-rear direction. Here, the sub-cross member 32 is arranged on a vehicle front side of the main cross member 30 and is apart from and substantially parallel to the main cross member 30. The longitudinal members 34 are provided across the main cross member 30 and the sub-cross member 32. As shown in FIGS. 1 and 2, in the suspension device 10, the suspension cross member 28 is attached and fixed to the vehicle body frame BF in a state where the longitudinal members 34 abut against the side members 26. As a result, the main cross member 30 and the sub-cross member 32 are arranged in the vehicle width direction (orthogonal to the vehicle front-rear direction) between the side members 26 extending in the vehicle front-rear direction. Although components of the suspension cross member are generally made of steel materials which are integrated by welding herein, the materials and a joining method thereof are not limited thereto. Moreover, such a configuration of the suspension cross member 28 does not exclude a case where the suspension cross member of the present disclosure includes only the main cross member. Although an engine is arranged on the main cross member 30 while a radiator is arranged on the sub-cross member in the suspension device 10, the technique of the present disclosure is not limited thereto. As shown in FIG. 1, the steering device SU (steering gearbox 60 thereof) is attached and fixed between the main cross member 30 and the sub-cross member 32. Such an attachment structure (attachment method) will be described below.

More specifically, the main cross member 30 is attached to each longitudinal member 34 via a bracket 36. The bracket 36 is attached to an upper portion of the main cross member 30 of the suspension cross member 28. As shown in FIG. 1, the bracket 36 covers the main cross member 30 from above, and is provided on an upper portion of an (vehicle width direction) end portion of the main cross member 30 as shown in FIG. 2. As shown in FIGS. 1 and 2, the longitudinal member 34 straddles an upper portion of the bracket 36. In this way, in the suspension device 10, the bracket 36 is incorporated inside the suspension cross member 28. However, the bracket 36 may also be attached to outside of the suspension cross member 28 (that is, the suspension cross member 28 may be attached to the side member 26 via the bracket 36). In any one of these modes, the suspension cross member 28 is connected to a vertical direction lower side of the vehicle body frame BF (side member 26). At this time, the bracket 36 is located inside or above the suspension cross member 28. Hereinafter, in order to distinguish the bracket 36 from the bracket 24, the bracket 24 is referred to as an upper bracket, and the bracket 36 is referred to as a lower bracket.

The sub-cross member 32 is also attached to the longitudinal member 34 via a support bracket 33. A lower end portion of the support bracket 33, which extends in a substantially vertical direction (substantially up-down direction), is joined to two vehicle width direction end portions of the sub-cross member 32 so as to cover the vehicle width direction end portions from above. An upper end portion of the support bracket 33, which is joined to the sub-cross member 32 in this manner, is joined to the longitudinal member 34, so that the sub-cross member 32 is attached to the longitudinal member 34.

The suspension cross member 28 further includes a lower arm bracket 38. Arm end portions 16c of two arm portions 16b, which are bifurcated inward in the vehicle width direction from the base portion 16a of the lower arm 16, are coupled to the lower arm bracket 38. As a result, the lower arm 16 is swingably supported around a support shaft of the bracket 38. Here, as shown in FIG. 1, the lower arm bracket 38 sandwiches the main cross member 30 in the vehicle front-rear direction. Here, the lower arm bracket 38 on the vehicle front side is also configured as the support bracket 33 joined to a vehicle width direction outer side end portion of the sub-cross member 32. Therefore, the lower arm bracket 38 on the vehicle front side serves as the support bracket 33. The lower arm bracket 38 on a vehicle rear side is coupled to an extended portion 30E of the main cross member 30. Further, an upper end portion of the lower arm bracket 38 is attached and fixed to the longitudinal member 34. In this way, the lower arm 16 is not directly connected to the lower bracket 36, and the lower bracket 36 is spaced apart from the lower arm 16.

In the suspension device 10, a leaf spring 40 is arranged transversely so as to extend in the vehicle width direction. The leaf spring 40 is arranged through an internal cavity 30s of the main cross member 30 of the suspension cross member 28. One end portion 40a of the leaf spring 40 is arranged as described below on a support portion 44 of the lower arm 16 on the left front wheel side (side of the hub 12 of FIG. 2), and the other end portion thereof is similarly arranged on the support portion 44 of the lower arm 16 on the right front wheel side (not shown).

The support portion 44 is substantially horizontal in the vehicle on a vertical direction upper side of, that is, above a substantial triangular region formed between the base portion 16a of the lower arm 16 and the arm portions 16b extending in a bifurcated manner from the base portion 16a. The leaf spring 40 generally extends in the vehicle width direction and has a shape that is slightly convexly curved upward in the vertical direction. An intermediate portion 40b of the leaf spring 40 is accommodated in the suspension cross member 28. More specifically, the intermediate portion 40b is accommodated in the main cross member 30 of the suspension cross member 28, and is supported with respect to the main cross member 30 by a bush member 47. Specifically, the intermediate portion 40b of the leaf spring 40 is supported with respect to the main cross member 30 by the bush member 47 (upper bush 48 and lower bush 50) on the left front wheel side and a bush member (upper bush and lower bush) on the right front wheel side, which is not shown. The bush member 47 includes: the upper bush 48 which is located on a vertical direction upper side of the leaf spring 40 and is connected to an upper side inner surface of the main cross member 30; and a lower bush 50 which is located on a vertical direction lower side of the leaf spring 40 and is connected to a lower side inner surface of the main cross member 30. The leaf spring 40 is pressed against the support portion 44 of the lower arm 16 by the upper bush 48. The upper bush 48 corresponds to a transmission portion which can transmit a force from the leaf spring 40 to the suspension cross member 28. The lower bush 50 supports the leaf spring 40 in a manner that allows the leaf spring 40 to play various roles or realize various functions, for example, to allow the leaf spring 40 to serve as a stabilizer. By providing the lower bush 50, when different forces are applied the left and right front wheels, for example, when the left front wheel is lifted upward while the right front wheel is lowered downward, the leaf spring 40 can be curved in a substantially S-shape, and can act on both the left and right front wheels.

As shown in FIG. 3, the lower arm 16 includes: the support portion 44; and a lower arm cover portion 16e provided to cover a vertical direction upper side of the support portion 44. In order to be distinguished from the cover portion 16e, a body portion 16d, which includes the base portion 16a and the arm portions 16b extending from the base portion 16a in the bifurcated manner described above, may also be referred to as a lower arm body portion.

In the lower arm 16, the lower arm body portion 16d is provided with the support portion 44 which supports the end portion of the leaf spring 40. The support portion 44 is made of a steel material which is the same metal material as that of the lower arm 16. An elastic body 44a is provided below the support portion 44. The elastic body 44a is provided to improve a shock absorbing ability when a large force acts on the support portion 44 and to absorb a difference between a rotation locus of the lower arm 16 and a rotation locus of the leaf spring 40. The lower arm 16, whose lower arm body portion 16d is attached with the cover portion 16e, has an opening portion 16f opening inward in the vehicle width direction. The leaf spring 40 extends into a space in the lower arm 16 through the opening portion 16f, and the end portion of the leaf spring 40 is supported by the support portion 44 of the lower arm 16. In this way, although there is a space in the lower arm 16, the cover portion 16e has a predetermined reinforcing shape which provides strength or rigidity equal to or greater than a predetermined level. Specifically, the opening portion 16f of the cover portion 16e of the lower arm 16 has a substantial arch shape (substantial U-shape). In FIGS. 1 and 2, the leaf spring 40 is spaced apart from an inner surface of the cover portion 16e.

A shock absorber 46, which is a device for absorbing shock, is provided to extend between the lower arm 16 configured as described above and the side member 26. One end portion 46a of the shock absorber 46 is connected to the lower arm 16. A connection portion 16g between the shock absorber 46 and the lower arm 16 is provided on a surface on a vertical direction upper side of the cover portion 16e of the lower arm 16, and is located substantially above the base portion 16a of the lower arm 16 in the vicinity thereof. The other end portion 46b of the shock absorber 46 is connected to a connection portion 25b between two upper arm brackets 25a of the upper bracket 24.

In the suspension device 10 having the above configuration, as is apparent from the above description and drawings, the upper bracket 24 (where the upper arm and the shock absorber are connected), which is connected to a vehicle width direction outer side of the side member 26, is independently spaced apart from the suspension cross member 28 connected to the vertical direction lower side of the side member 26. In contrast, in a suspension device in related art, a bracket connecting the suspension cross member and the side member extends to the vehicle width direction outer side of the side member 26. For example, in a suspension device of Patent Literature 2, a bracket connecting a suspension cross member and a side member covers a periphery of a coil spring around which a shock absorber extends, and is integrated with a bearing of the spring. Therefore, in the suspension device of Patent Literature 2, a design relationship between components thereof is very strong. Since the suspension device 10 has the above configuration as compared with such a suspension device in the related art, the suspension device 10 has a high degree of freedom in design. The upper bracket 24 is independent from the lower bracket 36 which covers the end portion of the main cross member 30 from above and is located on the vertical direction lower side of, that is, below the side member 26. As a result, the upper arm 14 and the shock absorber 46 which are connected to the upper bracket 24 are not directly connected to the lower bracket 36, that is, in a disconnected state. Therefore, the suspension device 10 has a higher degree of freedom in design. In this way, the suspension device 10 has a configuration in which the upper bracket 24 and the lower bracket 36 are independent of each other.

Further, the suspension device 10 is also excellent in strength or rigidity as described below with reference to FIGS. 2 and 4. FIG. 4 is a schematic view of the suspension device 10 of FIG. 2.

First, as described above, the one end portion 46a of the shock absorber 46 is connected to the lower arm 16, and the other end portion 46b thereof is connected to the upper bracket 24. The connection portion between the shock absorber 46 and the lower arm 16 is located on an outer side of the upper bracket 24 in the vehicle width direction. The upper bracket 24 is connected to the side member 26 from an outer side in the vehicle width direction. Therefore, the shock absorber 46 can exert a force to the side member 26 from outside to inside in the vehicle width direction of the vehicle. In this way, a first force transmission route is formed from the vehicle width direction outer side to the side member 26.

A second force transmission route, which is different from the first force transmission route from the vehicle width direction outer side to the side member 26, is formed on the vertical direction lower side of the side member 26. The upper bush 48 and the lower bracket 36, which is independent of the upper bracket 24, are present in the second transmission route. In the second transmission route, a force from the leaf spring 40 can be applied to the side member via the upper bush 48, the main cross member 30, the lower bracket 36, and the longitudinal member 34 in this order.

In such a suspension device 10, for example, when a force F acts on the wheel such that the hub 12 is lifted upward in the vertical direction, a moment M1 may act on the side member 26 via the lower arm 16 and the shock absorber 46 in the first transmission route from the outside of the vehicle to the inside of the vehicle as schematically shown in FIG. 4. Meanwhile, when such a force F acts on the wheel (hub 12), a force is transmitted from the lower arm 16 to the leaf spring 40, and a force from the leaf spring, that is, an elastic force is transmitted to the main cross member 30 via the upper bush 48. As a result, since the lower bracket 36 (which is independent of the upper bracket) is arranged on the vertical direction lower side of the side member 26, a moment M2 can be applied to the side member 26 from the inside of the vehicle to the outside of the vehicle as schematically shown in FIG. 4. As can be seen from FIG. 4, the moments M1 and M2 are forces directed to cancel each other. That is, when the force F acts on the wheel (hub 12), only a moment corresponding to the moment M1 may act on the side member 26 in the suspension device in the related art. In the suspension device 10 of the present embodiment, the moments M1 and M2 which are directed to cancel each other can act on the side member 26. Therefore, the suspension device 10 of the present embodiment is excellent in rigidity with respect to the force F without requiring structural changes which cause an increase in weight, such as thickening of the side member.

In the suspension device 10, the lower bracket 36 substantially includes a connection region with the main cross member 30 on a vehicle inner side of the side member 26 in the vehicle width direction (see FIGS. 2 and 4). The connection region extends to a vertical direction upper side of the upper bush 48 (which is located on an inner side of the side member 26 in the vehicle width direction). Therefore, as shown in FIGS. 2 and 4, a vertical direction upper side portion of the lower bracket 30 is located on an outer side of a vertical direction lower side portion thereof in the vehicle width direction. Therefore, when the force F acts on the wheel, the lower bracket 36 can more suitably apply an upward force, which is transmitted from the leaf spring 40 via the main cross member 30, to the side member 26 so as to generate the moment M2. In this way, the lower bracket 36 functions as a force transmission member that transmits a force between the leaf spring 40 and the side member 26 via the main cross member 30, the upper bush 48, and the like.

The suspension device 10 includes a bump rubber 52 or the like which is provided on the lower bracket 36 to increase impact resistance and the like of the suspension device 10.

Further, as described above, since the upper bracket 24 and the lower bracket 36 are independent of each other, the suspension device 10 is excellent in assembling properties of the vehicle body frame BF. Here, the suspension device in the related art as described above will be described first. FIG. 5 schematically shows the vehicle body frame BF, which includes left and right side members 26, and a suspension cross member 28' which includes a bracket B having a substantially L-shaped cross section. As can be seen from FIG. 5, in the suspension device in the related art, when the suspension cross member 28' which includes the bracket B is assembled to the vehicle body frame BF, precise positioning is required therebetween, such as in front, rear, left, right, and horizontal directions.

In contrast, in the suspension device 10 according to the present embodiment, as described above, the upper bracket 24 and the lower bracket 36 (that is, the suspension cross member 28) are separated from each other independently. That is, the upper bracket 24 is not fixed to the suspension cross member 28 and is separated from the suspension cross member 28 independently. With such a configuration, the upper bracket 24 may be attached to the side member 26 separately from the suspension cross member, and the suspension cross member 28 which includes the lower bracket 36 may be attached to the side member 26 separately from the upper bracket 24. The upper arm 14 and the shock absorber 46 are attached to the upper bracket 24. Then the suspension cross member 28 including the lower bracket 36 is assembled. Although the upper bracket 24 and the suspension cross member 28 are coupled via the shock absorber 46 and the lower arm 16, a position between the upper bracket 24 and the suspension cross member 28 is not fixedly determined. This configuration is easily understood from the fact that the lower arm 16 is swingably attached to the suspension cross member 28 and the end portion 46a of the shock absorber 46 is rotatable (swingable) around the support shaft. Therefore, as schematically shown in FIG. 6, when the suspension cross member 28 is attached to the vehicle body frame BF, there is no need to perform the precise positioning as that of the suspension device in the related art, rough positioning can be performed in the front, rear, left, right and horizontal directions to abut the suspension cross member 28 and the vehicle body frame BF against each other and a positional relationship thereof can be finely adjusted thereafter. When the suspension cross member 28 is fixed to the vehicle body frame BF (in particular, the side member 26) with the lower bracket 36, the upper bracket 24 can be firmly fixed to the side member 26. In this way, by employing the above configuration in which the upper bracket 24 and the lower bracket 32 (that is, the suspension cross member 28) are separated from each other independently, ease of assembling components particularly to the vehicle body frame BF (mainly the side member 26) of the suspension cross member 28 can be improved in the suspension device 10.

An attachment structure of the steering gearbox 60 of the steering device SU in the suspension device 10 will be described below.

As described above, the steering gearbox 60 of the steering device SU is supported and fixed between the main cross member 30 and the sub-cross member 32 of the suspension cross member 28. Here, FIG. 7 shows a schematic view of apart of the suspension device 10 as viewed from above. In FIG. 7, the lower arm 16, the upper bracket 24, and the like are omitted, and arrangement, the attachment structure, and the like of the steering gearbox 60 in the suspension device 10 are shown in a simplified manner. In FIG. 7, two longitudinal members 34 are shown, which are provided to connect the main cross member 30, the sub-cross member 32, and the like. In FIG. 7, left and right upper arms 14 and left and right shock absorbers 46 are schematically shown. The main cross member 30 and the sub-cross member 32 are frame members provided on the vehicle body frame BF (vehicle body), the main cross member 30 corresponds to a first cross member in the technique of the present disclosure, and the sub-cross member 32 corresponds to a second cross member in the technique of the present disclosure.

The steering device SU, whose steering gearbox 60 is provided between the main cross member 30 and the sub-cross member 32, is a rack and pinion type steering unit. In FIG. 7, the steering gearbox 60 (including a rack) of the steering device is provided in the vehicle width direction (left-right direction in FIG. 7), and is substantially parallel to the main cross member 30 and the sub-cross member 32. A pinion shaft 62, which is connected to a steering wheel side, is connected to the rack of the steering gearbox 60. Rotation of the pinion shaft 62 moves the rack in the steering gearbox 60, and the front wheels are steered via the knuckle 18 and the like.

The steering gearbox 60 includes a housing 64. Here, the housing 64 is formed separately from the steering gearbox 60, and is fixed to the steering gearbox 60. The housing 64 may be fixed to the steering gearbox 60 by a mechanical joining method, such as press fitting or screw joining, or by a metallurgical joining method, such as welding. The housing 64 may also be formed integrally with the steering gearbox 60 from the beginning. Since the housing 64 is supported by and fixed to the main cross member 30 and the sub-cross member 32, the steering gearbox 60 of the steering device SU is fixed between the cross members 30, 32.

Here, FIG. 8 shows a schematic cross-sectional view of a periphery of the steering gearbox 60 at a location where the housing 64 is attached. FIG. 8 is a schematic cross-sectional view at a location substantially along line VIII-VIII of FIG. 7. In FIG. 8, an illustration of a configuration inside the housing 64 of the steering gearbox 60 is omitted, and only an axis 60A of the steering gearbox 60 is shown in the housing 64. FIG. 8 corresponds to a cross section orthogonal to the axis 60A of the steering gearbox 60 when the housing 64 of the steering gearbox 60 is fixed to the cross members 30, 32. In FIG. 8, the cross members 30, 32 are also schematically shown, and an illustration of internal configurations and the like thereof is also omitted.

The housing 64 of the steering gearbox 60 includes a first abutting portion 66 and a second abutting portion 68. The abutting portions 66, 68 protrude in a radial direction around the axis 60A in FIG. 8. However, the abutting portions 66, 68 are not limited to have such protruding shapes, and may have, for example, recessed shapes. The first abutting portion 66 protrudes toward the main cross member 30. The second abutting portion 68 protrudes toward the sub-cross member 32. Meanwhile, a first support portion 72, to which the first abutting portion 66 is fixed by a bolt 70 serving as mechanical fixing means, is provided to the main cross member 30. A second support portion 76, to which the second abutting portion 68 is fixed by a bolt 74 serving as mechanical fixing means, is provided to the sub-cross member 32. The fixing means for fixing the first abutting portion 66 to the first support portion 72 may be other than the mechanical fixing means. The fixing means for fixing the second abutting portion 68 to the second support portion 76 may also be other than the mechanical fixing means.

Here, the first support portion 72 and the second support portion 76 are configured as plate-shaped members, and are provided to protrude from the main cross member 30 and the sub-cross member 32, respectively. The first support portion 72 and the second support portion 76 are bolted to and integrated with the main cross member 30 and the sub-cross member 32, respectively. The cross members 30, 32 and the support portions 72, 76 are designed such that attachment surfaces 72a, 76a described below have predetermined surface angles described below and the like since the support portions 72, 76 are bolted. However, the first support portion 72 and the second support portion 76 may be further welded to the corresponding cross members, or may be joined to the cross members by various joining methods.

The first support portion 72 of the main cross member 30 has the attachment surface (first attachment surface) 72a, and the second support portion 76 of the sub-cross member 32 has the attachment surface (second attachment surface) 76a. The first abutting portion 66 of the housing 64 has an abutting surface (first abutting surface) 66a abuttable against the first attachment surface 72a. The second abutting portion 68 of the housing 64 has an abutting surface (second abutting surface) 68a abuttable against the second attachment surface 76a. In the present embodiment, the first abutting surface 66a of the first abutting portion 66, which is abuttable against the first attachment surface 72a, and the second abutting surface 68a of the second abutting portion 68, which is abuttable against the second attachment surface 76a, have a relationship as shown in FIG. 8 and FIGS. 9A to 9C with respect to orientation and arrangement. That is, the first abutting surface 66a of the first abutting portion 66, which is abuttable against the first attachment surface 72a, and the second abutting surface 68a of the second abutting portion 68, which is abuttable against the second attachment surface 76a, are formed such that, in a direction around the axis 60A of the steering gearbox 60, the first abutting surface 66a is located on the first abutting portion 66 on the same side as a side where the second abutting surface 68a is located on the second abutting portion 68. Therefore, in FIG. 8, when the first abutting portion 66 is conceptually moved to substantially overlap the second abutting portion 68 in the direction around the axis 60A of the steering gearbox 60, the first abutting surface 66a substantially overlaps the second abutting surface 68a.

An attachment process of the steering gearbox 60 of the steering device SU will be described with reference to FIGS. 9A to 9C. FIG. 9A shows a state where (the housing 64 of) the steering gearbox 60 is separated from the cross members 30, 32 (pre-attachment state). As shown in FIG. 9, from the state of FIG. 9A, the first abutting surface 66a of the first abutting portion 66 is abutted against a lower side of the first attachment surface 72a of the first support portion 72 of the main cross member 30, and the second abutting surface 68a of the second abutting portion 68 is abutted against an upper side of the second attachment surface 76a of the second support portion 76 of the sub-cross member 32. As shown in FIG. 9C, then the first abutting portion 66 is fixed to the first support portion 72 and the second abutting portion 68 is fixed to the second support portion 76 by the bolts 70, 74 which are inserted into bolt holes from a lower side in FIG. 9C. Thereafter, bolting and the like are performed at an attachment assisting portion 80 shown in FIG. 7 in the present embodiment.

Here, a line (virtual surface) L1 which is parallel to the first attachment surface 72a of the first support portion 72 and a line (virtual surface) L2 which is parallel to the second attachment surface 76a of the second support portion 76 are shown in FIG. 8. As is apparent from FIG. 8, the first attachment surface 72a (line L1) is in a non-parallel relationship with the second attachment surface 76a (line L2). The first attachment surface 72a and the second attachment surface 76a are formed such that an angle between the first attachment surface 72a of the first support portion 72 and the second attachment surface 76a of the second support portion 76 is greater than 90° and less than 180°. That is, in FIG. 8, an angle θ1 defined between the first attachment surface 72a (line L1) and the second attachment surface 76a (line L2) is greater than 90' and less than 180° (90°<θ1<180°). Therefore, surface angles of the attachment surfaces 72a, 76a include various directional components as compared with surface angles of attachment surfaces (horizontal surfaces and vertical surfaces) of Patent Literature 1. In the attachment process of the steering gearbox 60 of the steering device SU in FIGS. 9A to 9C, the bolts 70, 74 are firmly tightened in a state where the abutting surfaces 66a, 68a of the abutting portions 66, 68 are abutted against the attachment surfaces 72a, 76a of the support portions 72, 76, so that positioning of a body of the steering gearbox 60 is sufficiently performed along the attachment surfaces 72a, 76a having the predetermined surface angles. That is, a position of the steering gearbox 60 of the steering device SU can be accurately positioned at a desired position. The angle θ1 may be set variously, for example, less than 110° or less than 100°. The angle θ1 may also be, for example, 95° or more.

Further, as is apparent from FIG. 8, the first attachment surface 72a (line L1) and the second attachment surface 76a (line L2) are not parallel to a horizontal surface (horizontal direction H) of the vehicle body on which the steering device SU is mounted, and are also inclined with respect to a vertical direction N. Therefore, a front-rear direction position and a vertical direction (up-down direction) position of the vehicle of the steering gearbox 60 can be more appropriately determined by the bolting in the attachment process of FIGS. 9A to 9C.

Further, in a fixed state of FIG. 8 (where the housing 64 of the steering gearbox 60 is fixed to the first and second support portions 72, 76), the first attachment surface 72a and the second attachment surface 76a are substantially parallel to the axis 60A of the steering gearbox 60. Therefore, in the attachment process shown in FIGS. 9A to 9C, the steering gearbox 60 can be more easily and more reliably set in a desired attachment posture (preferably, a posture in which the axis 60A of the steering gearbox 60 is substantially parallel to the cross members 30, 32).

The number of the bolts 70, 74 is three as shown in FIG. 7 (one bolt 70 and two bolts 74). In the present embodiment, desired positioning accuracy of the steering gearbox 60 is achieved by tightening the bolts 70, 74 at three points. However, the number, arrangement, and the like of the bolts 70, 74 are not limited to that of the present embodiment, and may be designed or selected to improve the positioning accuracy of the steering gearbox 60.

In the attachment of the steering gearbox 60 in the attachment process shown in FIGS. 9A to 9C, the steering gearbox 60 of the steering device SU is fixed with high positioning accuracy simply by performing bolting when the first abutting portion 66 is abutted against the first support portion 72 while the second abutting portion 68 is abutted against the second support portion 76. Therefore, an attachment operation of the above attachment structure of the steering device SU is excellent not only in terms of the positioning accuracy of the steering gearbox 60 but also in terms of workability of an operator.

In FIGS. 9A to 9C, a case where the steering gearbox 60 (housing 64) is attached to the cross members 30, 32 from an upper side of the suspension cross member 28 (cross members 30, 32) is described. However, the attachment may also be performed in an inverted state of FIGS. 9A to 9C. That is, the suspension cross member 28 may be arranged invertedly, and the housing 64 of the steering gearbox 60 may be abutted between the cross members 30, 32 from a lower side of the suspension cross member 28 to perform the bolting. In this case, the first abutting surface 66a of the first abutting portion 66 is abutted against the upper side of the first attachment surface 72a of the first support portion 72 of the main cross member 30, and the second abutting surface 68a of the second abutting portion 68 is abutted against the lower side of the second attachment surface 76a of the second support portion 76 of the sub-cross member 32. Either in a case where the attachment is performed in the posture shown in FIGS. 9A to 9C or in a case where the attachment is performed in the inverted posture, the abutting surfaces 66a. 68a are abutted against the attachment surfaces 72a, 76a, so that the steering gearbox 60 may be maintained in a desired attachment posture without being detached. Angles (for example, the angle θ1), shapes and the like of the attachment surfaces 72a, 76a or the abutting surfaces 66a. 68a may be set to enable the above attachment. Insertion directions of the bolts 70, 74 are not limited to directions shown in FIG. 8 and FIGS. 9A to 9C, and may be determined by considering the workability of the operator and the like.

At least one of the support portions 72, 76 and the cross members 30, 32 may be designed to include a predetermined positioning structure (for example, a fitting structure) such that the support portions 72, 76 are easily positioned on and attached to the cross members 30, 32. As a result, by providing the support portions 72, 76 on the cross members 30, 32, the attachment surfaces 72a, 76a of the support portions 72, 76 may have the above surface angles and the like. Alternatively, the support portions 72, 76 may be provided integrally (for example, by casting) with various attachment members (not shown) to be attached to the cross members 30, 32. The attachment surfaces 72a, 76a may have the above surface angles and the like by fixing the attachment members to the cross members 30, 32 by various joining methods. Further, the support portions 72, 76 are not limited to be the plate-like members, and can have various configurations (shapes and the like). For example, one of the support portions 72, 76 may be configured to have a substantially triangular cross section (in a cross section on a virtual surface extending substantially in the vehicle front-rear direction and extending substantially in the vertical direction), and outer surfaces of any of the support portions 72, 76 may serve as the attachment surfaces 72a, 76a. Further, the support portions 72, 76 are not limited to be directly provided on the cross members 30, 32, and various members (for example, positioning members) may be interposed therebetween.

In the suspension device 10, the attachment operation of such a steering gearbox 60 can be easily performed even after the upper bracket is connected to the suspension cross member 28 via the shock absorber 46. This is because the suspension device 10 is configured as described above, for example, the lower arm 16 is swingably attached to the suspension cross member 28, and the end portion 46a of the shock absorber 46 is rotatable (swingable) around the support shaft.

The present disclosure is not limited to the above-described embodiment, and may be appropriately modified and implemented without departing from the spirit of the present disclosure.

In the above embodiment, the steering gearbox 60 is fixed to the first support portion 72 extending from the main cross member 30 and the second support portion 76 extending from the sub-cross member 32 which is spaced apart from the main cross member in the vehicle front-rear direction. However, all of the support portions may be provided for one cross member (frame member) extending in the vehicle width direction. Moreover, the number of the support portions may be more than two. Further, although the two support portions are configured separately in the above embodiment, two or more support portions may be formed separately or integrally.

In the above embodiment, the bolts (with nuts) 70, 74 are simply inserted into the corresponding bolt holes of the support portions 72, 76 and the abutting portions 66, 68, respectively. A rubber bush or the like may be used for tightening the bolts 70, 74. For example, the rubber bush may be provided between the bolt holes and the bolts 70, 74 to improve a vibration damping effect.

The above components of the technique of the present disclosure may be made of a variety of materials (not limited to be made of the material described above). For example, the support portion 44 is not limited to be made of the steel material, and may also be made of other materials, such as a non-ferrous metal material or a resin material. The support portion 44 may also be made of a material different from that of the lower arm.

This application is based on a Japanese Patent Application (Japanese Patent Application No. 2017-236357) filed on Dec. 8, 2017, the contents of which are incorporated herein by reference.

INDUSTRIAL APPLICABILITY

The present disclosure is useful in that the positioning accuracy of the steering gearbox can be improved without impairing the workability of the operator and a highly accurate assembled vehicle can be manufactured without impairing the workability.

REFERENCE SIGNS LIST 10 suspension device
14 upper arm
16 lower arm
18 knuckle
24 upper bracket
26 side member
28 suspension cross member
30 main cross member
32 sub-cross member
34 longitudinal member
36 lower bracket
40 leaf spring
46 shock absorber
47 bush member
48 upper bush
50 lower bush
60 steering gearbox
62 pinion shaft
64 housing
66 first abutting portion
68 second abutting portion
72 first support portion
72a first attachment surface
76 second support portion
76a second attachment surface

The invention claimed is:

1. A steering gearbox attachment structure comprising:
a housing of a steering gearbox, the housing including a first abutting portion and a second abutting portion;
a first support portion being provided to a first cross member provided in a suspension device of a vehicle, and having a first attachment surface being abuttable against the first abutting portion;
a second support portion being provided to a second cross member provided on a vehicle front side of the first cross member in the suspension device, and having a second attachment surface being abuttable against the second abutting portion;
a first fixing portion configured to mechanically fix the first abutting portion to the first support portion in a state where the first abutting portion abuts against the first attachment surface and the second abutting portion abuts against the second attachment surface; and
a second fixing portion configured to mechanically fix the second abutting portion to the second support portion in a state where the first abutting portion abuts against the first attachment surface and the second abutting portion abuts against the second attachment surface,
wherein the first cross member and the second cross member extend in a vehicle width direction,
wherein an angle between the first attachment surface of the first support portion and the second attachment surface of the second support portion is greater than 90° and less than 110°, and
wherein a first abutting surface of the first abutting portion and a second abutting surface of the second abutting portion are formed such that, in a direction around an axis of the steering gearbox, the first abutting surface is located on the first abutting portion on a same side as a side where the second abutting surface is located on the second abutting portion, the first abutting surface being abuttable against the first attachment surface, the second abutting surface being abuttable against the second attachment surface.

2. The steering gearbox attachment structure according to claim 1, wherein the first attachment surface and the second attachment surface are formed such that the first attachment surface of the first support portion and the second attachment surface of the second support portion are substantially parallel to an axis of the steering gearbox, in a state where the first abutting portion is fixed to the first support portion and the second abutting portion is fixed to the second support portion.

* * * * *